United States Patent [19]

Iida

[11] 4,399,315

[45] Aug. 16, 1983

[54] GAS-INSULATED ELECTRIC APPARATUS

[75] Inventor: Tatsuo Iida, Ebina, Japan

[73] Assignee: Tokyo Shibaura Denki Kabushiki Kaisha, Kawasaki, Japan

[21] Appl. No.: 290,323

[22] Filed: Aug. 5, 1981

[30] Foreign Application Priority Data

Aug. 12, 1980 [JP] Japan ............... 55-110901

[51] Int. Cl.³ .................................. H02G 15/24
[52] U.S. Cl. .................. 174/21 C; 174/84 S; 174/94 R; 285/363
[58] Field of Search ............. 174/21 C, 21 R, 84 S, 174/88 C, 88 S, 94 R; 285/363, 368

[56] References Cited

FOREIGN PATENT DOCUMENTS 54-180924 12/1979 Japan .
55-103006 8/1980 Japan .

OTHER PUBLICATIONS

*Primary Examiner*—A. T. Grimley
*Assistant Examiner*—D. A. Tone
*Attorney, Agent, or Firm*—Oblon, Fisher, Spivak, McClelland & Maier

[57] ABSTRACT

A gas-insulated electric apparatus improved in the conductive, heat-releasing, waterproof and rustproof properties, which comprises a plurality of linearly arranged grounded metal cases; and wherein a flange is formed at both ends of all adjacent metal cases; the flanges provided at the mutually facing ends of said metal cases are tightly joined together by proper means for the electric and mechanical connection of said metal cases; and a compound prepared by mixing silicone oil with 20 to 40% by weight of zinc powder and 5 to 15% by weight of aluminum powder is applied to the surface of the junction of the flanges.

4 Claims, 3 Drawing Figures

GAS-INSULATED ELECTRIC APPARATUS

BACKGROUND OF THE INVENTION

This invention relates to a gas-insulated electric apparatus wherein an improved compound is applied to the junction of flanges set adjacent to each other to connect a plurality of metal pressure vessels used, for example, with a gas-insulated electric apparatus.

As shown in FIG. 1, each case 2 of a gas-insulated electric apparatus which has a ground potential contains a conductor 1 and high voltage insulation gas 3 (for example, $SF_6$ gas) with an insulator (not shown) interposed therebetween. All adjacent cases 2 are joined together by flange sections 4 which are formed at the mutually facing ends of the cases 2 and electrically and mechanically connected together by means of seal packing 5, bolts 6b and nuts 6a.

Where the case 2 is grounded at many points as shown in FIG. 1, namely where support legs 7 electrically and mechanically connected to the case 2 are joined to a grounding net 9 at several points by means of a grounding line 8, then induced currents $i$, $i'$ flow through a closed loop formed of the case 2-support legs 7-grounding lines 8-grounding net 9. As seen from FIG. 2, the induced currents $i$, $i'$ also run through the flange junction 10. This flange junction constitutes an important section sealed with gas. Water tends to seep into that portion of the flange junction surface 10 which is exposed to the open air, with the possibility that the portion of the flange junction surface 10 to which the packing 5 is attached is rotten, probably causing the sealed gas to leak out. Therefore, it is necessary to apply a waterproof and rust preventing agent to the flange junction surface 10 to avoid the seeping of water thereinto. Since, the aforementioned induced currents $i$, $i'$ run through the flange junction 10, the process is proposed which applies, for example, a conductive compound to said flange junction 10 to draw out said induction currents therefrom.

However, the conventional waterproof and rust-preventing agents have merits and demerits as indicated in Table 1 below.

TABLE 1

| Properties of Conventional Waterproof and Rust-Preventing Agents | | | |
|---|---|---|---|
| Kind of waterproof and rust-preventing agents | Waterproof and rust-preventing property | Influence on packing | Conductive capacity |
| Alcan Universal Joint Compound* (mineral oil + $TiO_2$) | medium | great | large |
| Solidifying silicone rubber | great | none | none |
| Non-solidifying liquid gasket** | great | small | none |
| Silicone grease TSK 5401L*** | great | none | small |

*Trade mark, from Alcan Asia Ltd.
**Vegetable oil + Talc + phenol etc.
***Trade mark, from Toshiba Silicone Co. Ltd.

Therefore, the conventional process of resolving the above-mentioned difficulties comprised applying waterproof and rust-preventing solidifying silicone rubber, nonsolidifying liquid gasket or silicone grease, and electrically short circuiting all adjacent cases 2 by shunt 11 to let the aforesaid induced currents $i$, $i'$ bypass the flange junction.

However, the construction of a shunt over the whole assembly of the flange junction and associated parts is extremely expensive and involves a complicated arrangement.

SUMMARY OF THE INVENTION

It is accordingly the object of this invention to provide a gas-insulated electric apparatus which eliminates the necessity of constructing a shunt by applying a waterproof and rust-preventing agent which itself has a conductive and heat-releasing property.

To attain the above-mentioned object, this invention provides a gas-insulated electric apparatus wherein all adjacent metal cases are electrically and mechanically connected together by flanges formed at the mutually facing ends of said cases; and a compound prepared by mixing silicone oil with 20 to 40% by weight of zinc powder and 5 to 15% by weight of aluminum powder is applied to the surface of a junction of flanges formed at the mutually facing ends of all adjacent metal cases for the electrical and mechanical connection thereof.

DESCRIPTION OF THE PREFERRED EMBODIMENT

Figure 1:
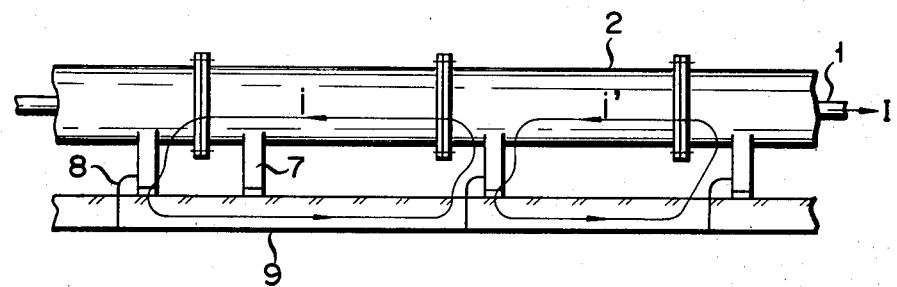
FIG. 1 is a lateral view of part of a single phase bus of a gas-insulated electric apparatus.
Figure 2:
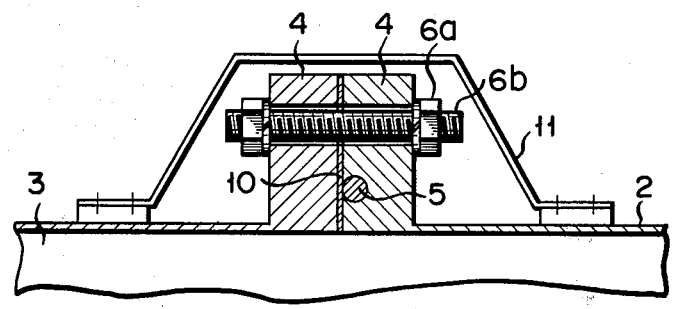
FIG. 2 is a sectional view of a flange junction provided in the conventional gas-insulated electric apparatus.

The object of this invention is to eliminate the necessity of constructing a shunt as is the case with the conventional gas-insulated electric apparatus by applying a compound 100 having conductive, heat-releasing and waterproof properties. The parts of FIG. 3 the same as those of FIGS. 1 and 2 are denoted by the same numerals, description thereof being omitted.

A compound 100 embodying this invention which has conductive, heat-releasing and waterproof properties is prepared by mixing silicone oil with 20 to 40% or preferably 35% by weight (based on the whole weight of the compound including silicone oil) of zinc powder and 5 to 15% or preferably 7% by weight (based on the whole weight of the compound including silicone oil) of aluminum powder.

Examples of silicone oil useful in this invention are those which include as a main component polysiloxane, such as straight-chain dimethyl polysiloxane and methylphenyl polysiloxane. The particle sizes of the zinc powder and aluminum powder may be suitably selected. The metal powders mixed with the silicone oil include not only the powders of zinc and aluminum, but also those of copper and magnesium. Inclusion of these metals may useful for improving electric conductivity by cutting through the oxide layer on the surface of the flange as a pair of the flanges are being tightened.

Figure 3:
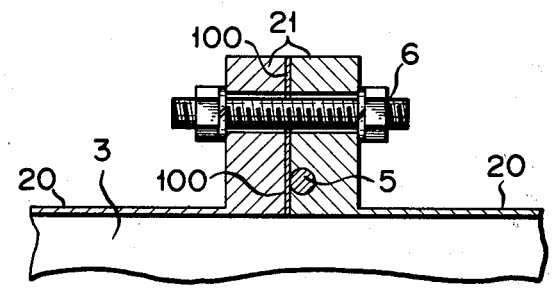
FIG. 3 is a sectional view of a flange junction provided in a gas-insulated electric apparatus embodying this invention.

The compound of this invention containing the above-defined amounts of zinc powder and aluminum powder was applied, as shown in FIG. 3, to the surface of the junction of the aluminum flanges 21 formed at the mutually facing ends of every adjacent aluminium cases 20 (the surface of the flange junction is left use treated). After application of the compound, the joined flanges were tightened together by means of a bolt 6b and nut 6a. Determination was made of the properties of the tightened aluminum flanges 21, the results being set forth in Table 2 below, together with data obtained from the controls.

TABLE 2

| Coating applied to the surface of the flange junction | Contact resistance |
| --- | --- |
| No coating | 1 |
| Silicone grease TSK 5401L | 0.85 |
| Compound formed of 28% by wt of zinc power 7% by wt of aluminum power | 0.6 |

As described above, the compound of this invention which has conductive, heat-releasing and waterproof properties contains metal powders, manifests an extremely high heat conductivity of about $1.5 \times 10^3$ cal/cm . sec, °C., thereby suppressing the generation of heat by induced current. Since the compound contains metal powders, the oil component is less likely to flow away or segregate at high temperature. In other words, the oil component of the compound which has a waterproof and rust-preventing function is kept under a stable condition by the metal powders, thereby prominently enhancing said function.

With a gas-insulated electric apparatus embodying this invention, a compound prepared, as described above, by mixing silicone oil with powders of zinc and aluminum is applied to the surface of the joined flanges. The compound having high conductive and heat-releasing properties electrically connects the mutually facing planes of the joined flanges, thereby enabling sheath current to flow without constructing a bias shunt. Further, the silicone oil constituting the main component of the compound renders the surface of the flange junction waterproof and rustproof. Therefore, the gas-insulated electric apparatus of this invention can be manufactured with more simplified arrangement and at lower cost than the conventional type fitted with a shunt.

What is claimed is:

1. A gas-insulated electric apparatus which comprises a plurality of linearly arranged grounded metal cases; and wherein a flange is formed at both ends of all adjacent metal cases; the flanges provided at the mutually facing ends of said metal cases are tightly joined together by proper means for the electric and mechanical connection of said metal cases; and a compound prepared by mixing silicone oil with 20 to 40% by weight of zinc powder (based on the whole weight of the compound) and 5 to 15% by weight of aluminum powder (based on the whole weight of the compound) is applied to the surface of the junction of the flanges.

2. The gas-insulated electric apparatus according to claim 1, wherein the content of zinc powder is chosen to be 35% by weight.

3. The gas-insulated electric apparatus according to claim 1, wherein the content of aluminum powder is chosen to be 7% by weight.

4. The gas-insulated electric apparatus according to claim 1, wherein the compound further includes at least one metal powder selected from the group consisting of Cu powder and Mg powder.

* * * * *